Nov. 26, 1968
H. LA MERS
3,413,447
INFORMATION-BEARING LABEL AND READING METHOD
AND APPARATUS THEREFOR
Filed Feb. 25, 1963
5 Sheets-Sheet 1
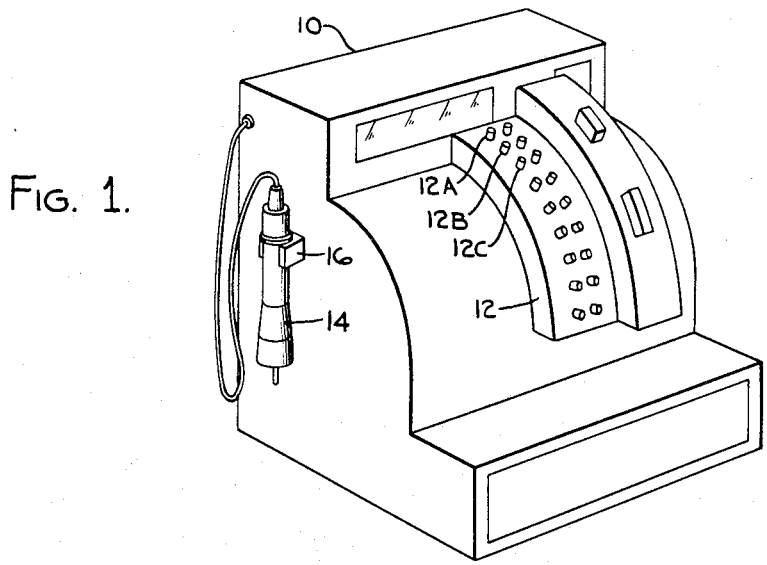
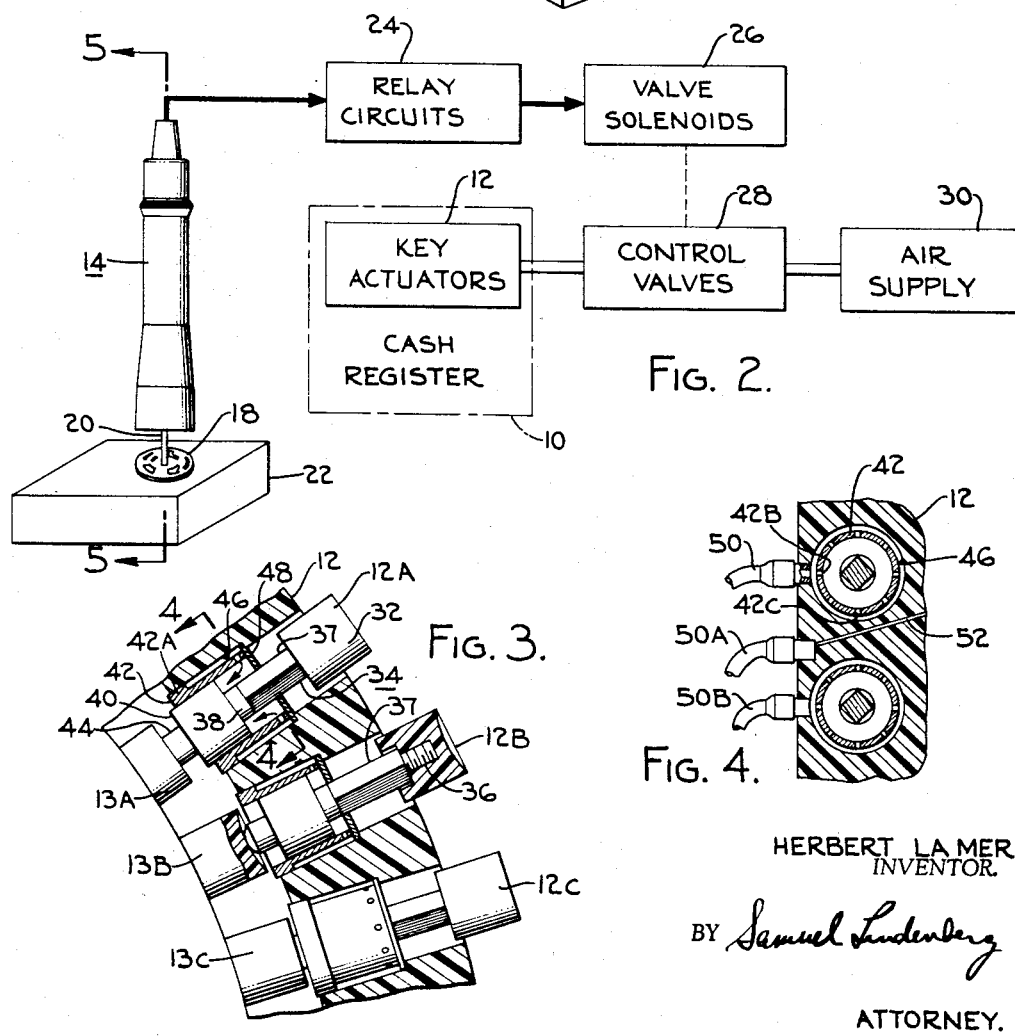
HERBERT LA MERS
INVENTOR.
BY Samuel Lindenberg
ATTORNEY.

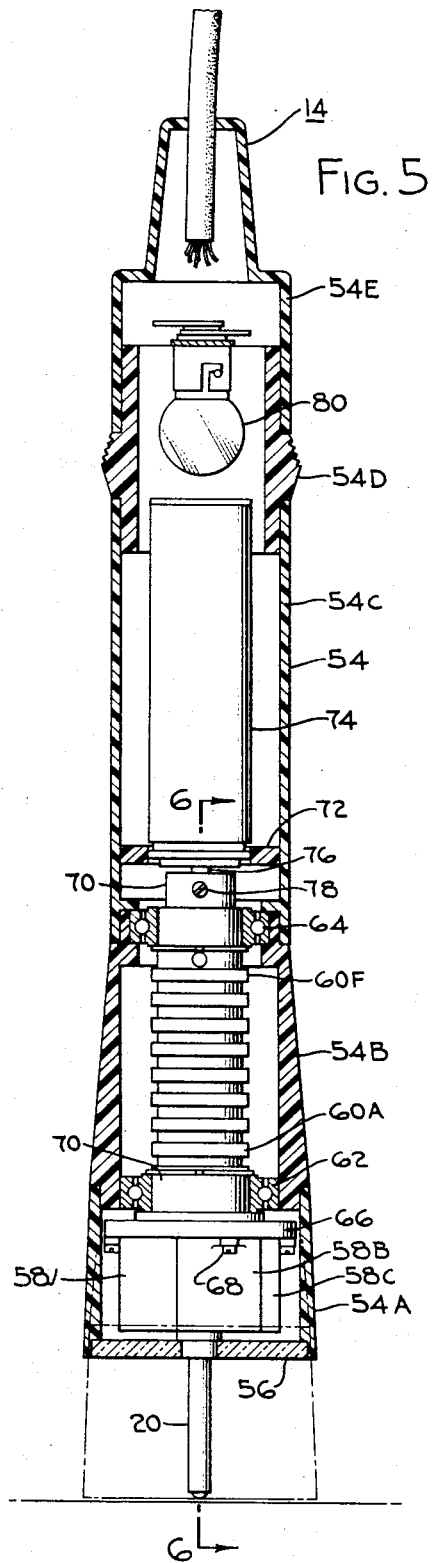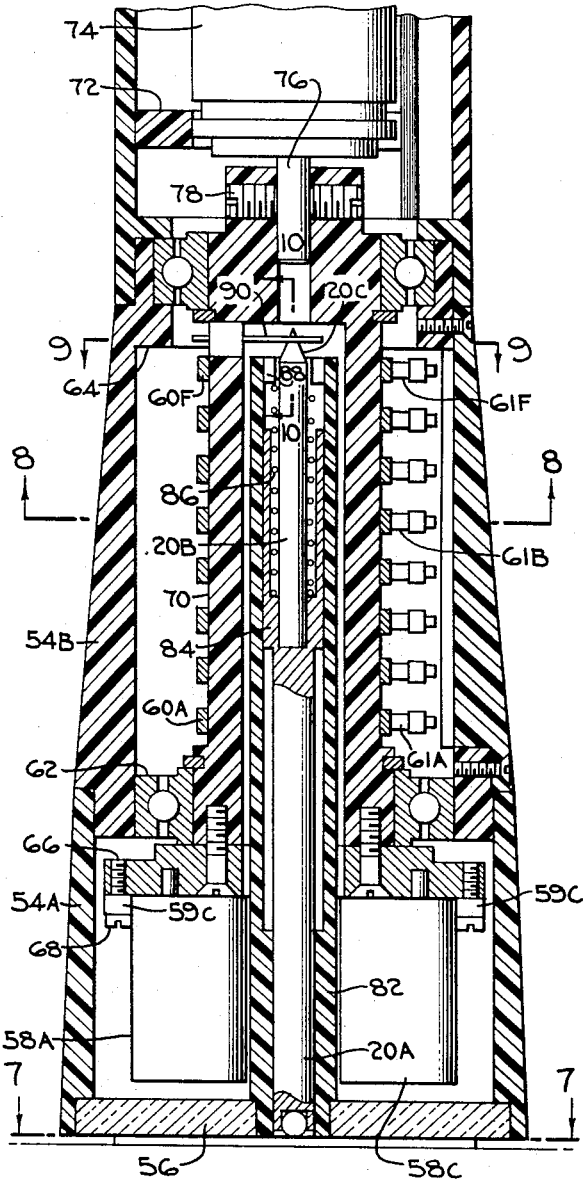
FIG. 5.
FIG. 6.
HERBERT LA MERS
INVENTOR.
BY Samuel Lindenberg
ATTORNEY.

HERBERT LA MERS
*INVENTOR.*

BY *Samuel Lindenberg*

ATTORNEY.

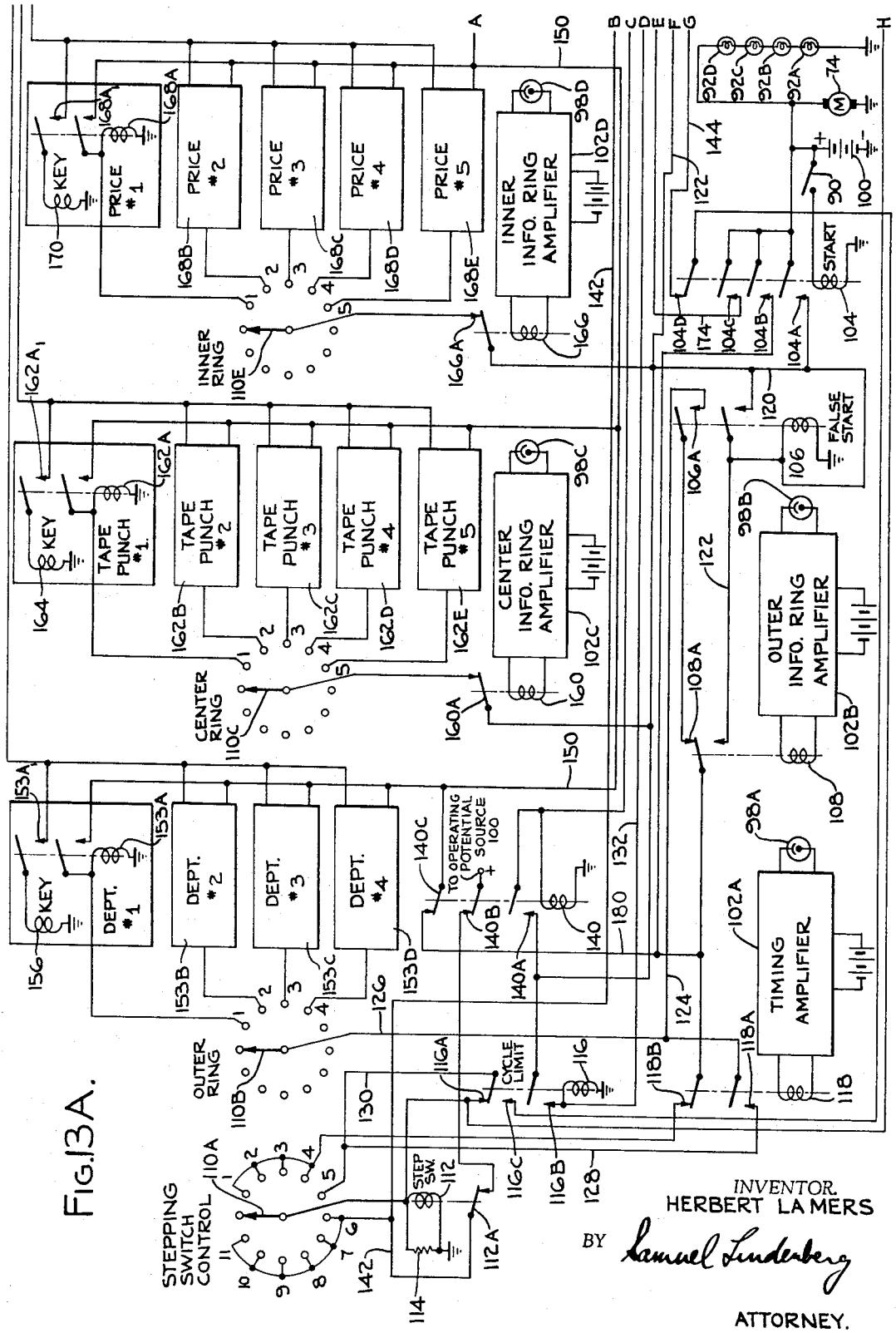

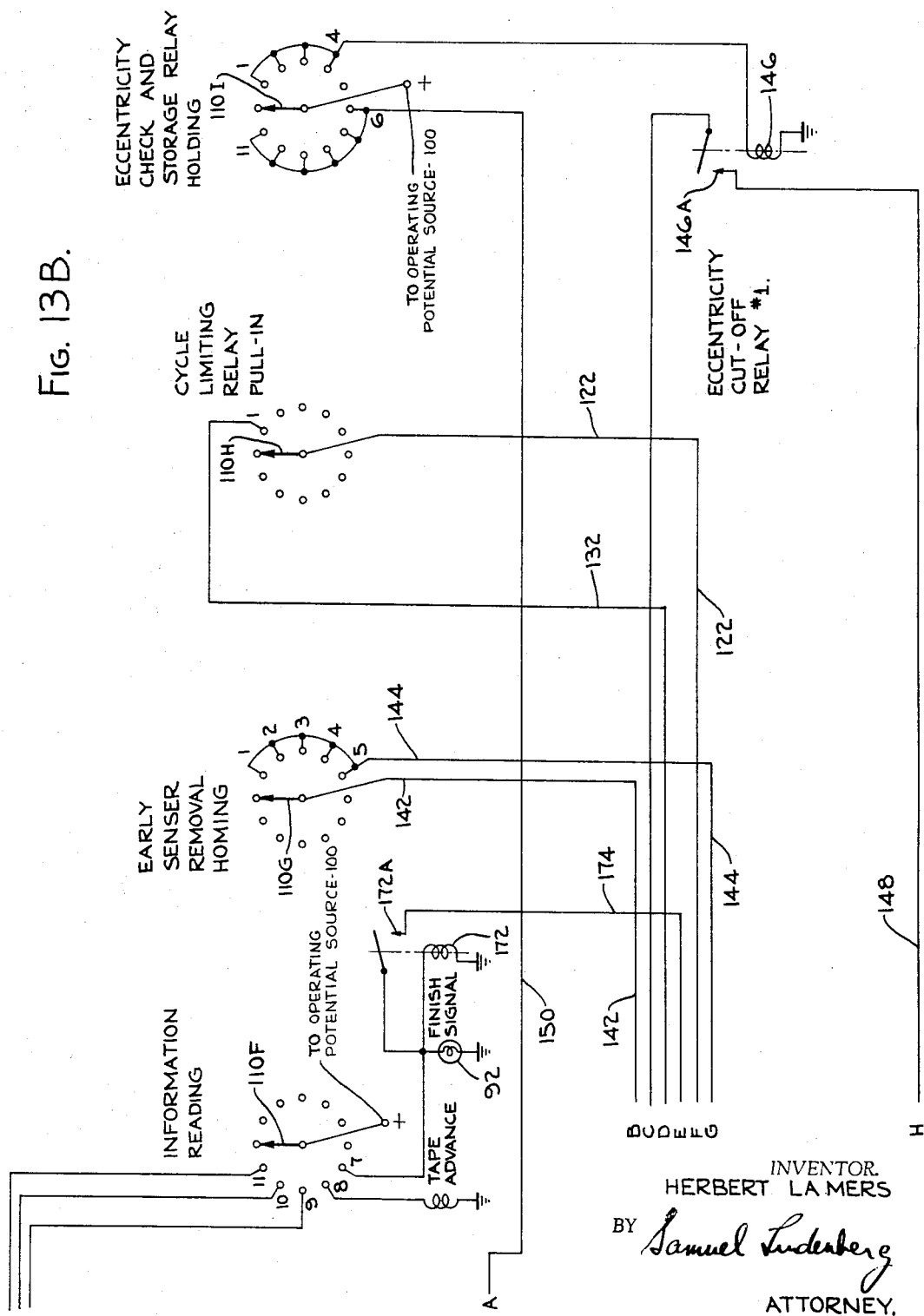

United States Patent Office 3,413,447
Patented Nov. 26, 1968

3,413,447
INFORMATION-BEARING LABEL AND READING
METHOD AND APPARATUS THEREFOR
Herbert La Mers, Van Nuys, Calif., assignor to The Monarch Marking System Company, Dayton, Ohio, a corporation of Ohio
Filed Feb. 25, 1963, Ser. No. 260,748
34 Claims. (Cl. 235—61.6)

ABSTRACT OF THE DISCLOSURE

A label is disclosed which is adaptable for a variety of uses, such as, attachment to articles offered for sale in a department store or food market to indicate the price, department concerned, or the like. The label includes an aligner, for example, a hole formed in the label stock about which are symmetrically positioned concentric circular rings or patterns of machine readable information, such as timing and pricing data. The provision of a hole in the center of concentrically arranged data enables alignment of the label with a suitable reader by merely engaging the hole with an appropriately positioned cooperating member formed on the reader, for example, a protruding probe. Also disclosed is a label scanning device or reader. The reader includes a probe engageable in the label hole for alignment purposes and once engaged axially shiftable to bring the label into scanning position and commence the reading operation. The reader further includes transducers radially displaced about the probe in registration with the information rings of a properly aligned label and movable in circular patterns for scanning the data in the respective information rings with which they are associated when the probe has been axially shifted and the label brought into scanning position.

---

This invention relates to label reading and interpreting, and more particularly, to improvements in labels and reading methods and apparatus therefor.

While the various label reading features and principles of this invention find usefulness in a broad range of applications, for the purposes of clarity and illustration, the invention is described hereafter in connection with one specific environment in which the invention possesses a substantial degree of utility. Specifically, the invention is described in connection with its use in a department store or food market, for example, at a checkout counter or cashier, for automatically reading data, such as the price of an article, and in response thereto entering the data into a suitable utilization device, for example, a keyboard actuated cash register.

The customary purchasing procedure employed in department stores and food markets is one wherein the purchaser brings the goods selected to a sales clerk who looks for a label on the goods indicating the price thereof, and then proceeds to ring up the sale on the cash register. In many instances the clerk also fills out associated paper work for purposes such as giving the sales person credit for the sale, or for inventory control purposes. Attempts have been made to introduce the benefits of automatic data handling by using special markings or perforations on the label, whereby the label can be scanned by special machinery for deriving information therefrom for data processing. Thus far, such machinery has been expensive and cumbersome. The benefits of this type of data processing, while suitable for department stores, has not been extended to food markets even though the inventory control problem, with respect to the packaged foods, is as great.

In those stores where a large number of sales occur, it is usually found that the bottleneck, as far as the smooth flow of customers is concerned, occurs at the location of the cash register. The clerk has to find the price for the goods and then to ring up that price on the cash register, then to make change. Sometimes a clerk misreads a price on the label, or in the case of packaged foods, misreads the price stamped on the container. This can result in either a financial loss on the part of the owner and/or bad public relations, depending upon who loses by the mistake. An error in ringing up the price of the goods is not an uncommon occurrence. A principal objective of this invention is to provide an improved information-bearing label which is rapidly and easily brought into proper registration with a scanning device or reader, thereby enabling rapid readings to be made free of errors due to label misalignment.

A further and equally important object of this invention is to provide a method of reading the improved label of this invention which uses a minimum number of steps, each of which is simple in nature, thereby facilitating a shortening of the reading cycle and a simplification of the scanning apparatus.

An object of this invention is to provide a novel apparatus for reading a label and interpreting the information read thereon.

Yet another object of this invention is the provision of a unique system for operating the keys of a keyboard from information derived by automatically scanning a label.

Still another object of the present invention is the provision of a system having a device for scanning a label for deriving information therefrom which is simple to operate and substantially error free.

Yet another object of this invention is the provision of an improved, simple system for scanning a label to derive the information contained thereon and for operating a cash register in accordance with the information derived.

These and other objects of this invention are achieved in a system wherein, on each item to be passed through a label reading station, such as, a tallying or cashier's location, a label is attached. This label has information thereon in the form of several concentric rings with machine readable data preferably in the form of black or white regions disposed around these concentric rings. Alignment means, for example, a hole, is in the center of the label. The scanning device includes a probe, the tip of which is engaged or inserted in the hole for alignment purposes. The scanning device is then moved downward upon the probe and when it is sufficiently close to the label so that interfering light from other sources is substantially excluded, the scanner commences to read the data disposed in the concentric rings on the label. The scanner in a preferred form includes illumination sources and transducers, for example, photocells, for converting the black and white regions into electrical signals. The signals which are derived during the interval within which the scanning of the label occurs are stored in a suitable storage means, such as in relay circuits.

In the environment in which the preferred embodiment is described, for illustrative purposes as being useful, namely, at a check-out counter or cashier location of a department store or food market, a device is provided which fits over the keyboard of a cash register. This device includes a plurality of pneumatically operated keys, each of which fits over each key in the cash register. A separate control valve is provided for each key which is controlled by a separate valve solenoid. Each one of the relay circuits is associated with a separate one of the valve solenoids. At the end of a scanning cycle the relay circuits, which have the scanned data stored therein, are enabled to operate the associated ones of the valve solenoids which in turn operate the associated ones of the control valves. This enables air to be applied to the pneumatically operated key actuators on the cash register, to ring up or enter the information derived from the label.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a perspective view of a cash register with an embodiment of the invention attached thereto.

FIGURE 2 is a schematic drawing illustrating the system of the invention.

FIGURE 3 is a cross section of the key actuators mounted on the cash register keyboard for actuating the keys of the cash register.

FIGURE 4 is a cross section taken along the lines 4—4 in FIGURE 3.

FIGURE 5 is a cross sectional view of the scanner employed for reading a label in the embodiment of the invention.

FIGURE 6 is an enlarged cross sectional view along the lines 6—6 of FIGURE 5 illustrating details of the portion of the scanner which is positioned adjacent the label.

Figure 7:
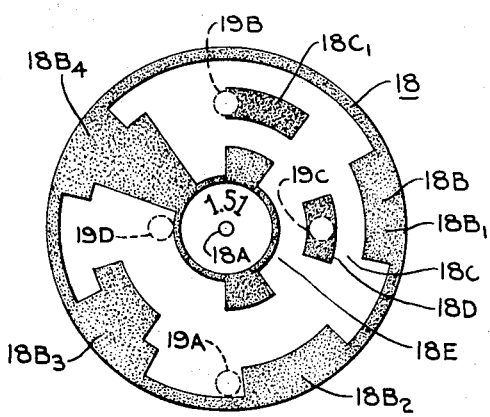
FIGURE 7 illustrates a typical label, employed with this invention.

FIGURES 13 and 13B together constitute a circuit diagram of the wiring and electrical structures employed in the embodiment of the invention.

Reference is now made to FIGURE 1, which shows a preferred embodiment of the invention being used in conjunction with a cash register. It is to be understood that this is only one application for the embodiment of the invention and is being used for illustrative purposes only. Its output can be employed to operate other types of data receiving devices or keyboards for other devices than cash registers, whereby data entry into machines responsive to said keyboards can be effectuated. Accordingly, the description herein is not by way of limitation.

A cash register 10, as shown in FIGURE 1, has a keyboard actuating device 12, positioned over the keys of the register which are to be actuated. The key actuating device 12 is fastened to the cash register by any suitable means, such as screws, not shown. It supports a plurality of pneumatically actuated keys 12A, 12B, 12C, which are positioned immediately above corresponding keys of the cash register. The structure and operation of these pneumatically operated keys will become more clear as this description progresses. At this time it should suffice to understand that when one of these pneumatically operated keys is actuated, in response to the operation of the embodiment of this invention, it depresses the cash register key beneath it and with which it is associated to cause the register to ring up the amount represented by the actuated cash register key. The pneumatically operated keys are constructed in a manner so that they too can be manually depressed to operate the cash register key underneath, if it is desired to operate the cash register manually instead of automatically in conjunction with this invention.

A preferred embodiment of a label scanner 14, may be supported when not in use, in the manner shown, on a suitable holder 16, which is attached to the cash register. As will become more clear from the following explanation, when in use, the label scanner 14 is positioned opposite and in operating proximity to a label having machine readable data thereon, preferably in the form of photosensible marks such as the price of an article. The label scanner generates electrical signals from the information on the label. These electrical signals are converted by suitable circuits into control signals for use with a suitable utilization device such as for control valves. These control valves apply air to those of the pneumatically operated keys which correspond in value to the amount recorded on the label being scanned.

FIGURE 2 is a block schematic diagram of the preferred embodiment of the invention. The label scanner 14 is shown superimposed over a label 18. The label scanner 14 has a protruding stylus or probe 20, which in a preferred form is spring biased to extend therefrom but which may be telescoped into the body of the label scanner 14 by applying pressure thereto. The stylus tip is engaged or inserted into an alignment means or aligner, for example, a hole in the center of the label, for the purpose of aligning the scanner 14 properly for reading the label. The label 18 may be attached to any suitable article 22. The label will contain information concerning the article 22, such as the price and type of article, the department concerned, etc. It will be understood that the information on the label can be any type of information desired.

When the label scanner 14 is brought into operating relationship with the label 18, which occurs when it is close enough to the label 18 so that light from extraneous sources cannot get into the scanner, the scanner commences its operation. As will be seen subsequently herein, the scanner in a preferred form includes light sources and transducers such as photocells which are so positioned so that only the reflected light from the label can actuate the photocells. The output signals from the actuated photocells are applied to storage means or relay circuits 24. These relay circuits serve the function of properly sorting out and storing these signals until a reading cycle has been completed.

Upon the completion of the reading cycle the relay circuits are permitted to operate a utilization device, for example, to actuate valve solenoids 26, a different one of which is associated with a different control valve 28. Thereby the information which has been derived by the scanner from the label is converted to a form, whereby control valves are opened or closed in accordance with the machine readable characters or intelligence thereof, to permit air from an air supply 30 to be applied to the pneumatically operated keys 12, designated here as key actuators for the keys of the cash register 10. It will be appreciated that each control valve is associated with and actuates a different one of the pneumatically actuated key actuators 12. A different one of the valve solenoids 26 is associated with a different one of the control valves 28, and the relay circuits are wired to operate the valve solenoids so that, for example, a price which is recorded on the label 18 will be rung up on the cash register by the medium of the electrical signals from the scanner operating proper ones of the relay circuits to operate proper ones of the valve solenoids and thereby the control valves to finally cause the actuation of the key actuators which cause the cash register to ring up the proper amount.

FIGURE 3 is a cross section taken through three pneumatically operated keys for example, 12A, 12B and 12C. The pneumatically operated key 12A is shown as being in its operated position while the remaining keys are shown as being in their unoperated position. Underneath the respective keys 12A, 12B and 12C are the cash register keys respectively 13A, 13B, and 13C which are associated therewith. The key support member 12 has holes drilled therethrough into which each one of the keys may be fitted.

Each one of the keys has a cap member 32, which is threaded onto a shaft member 34. The cap member extends externally of the member 12 and will have on the outside thereof numbers or letters corresponding to the information on the register key beneath it and with which it is associated. One end 36, of the shaft member is threaded to enable the cap to be screwed thereon. The shaft member 34 has a rectangular cross section portion 37 adjacent the threaded portion. A circular cross section portion 38 extends from the rectangular portion 37, to a piston portion 40. The piston portion 40 has a circular cross section which is larger than the cross section of the circular portion 38, in order that it acts as a piston in cooperation with the circular walls of a sleeve member 42. The piston portion 40 is connected to a terminating end section 44, which has a circular cross section similar to that of the section 38. The terminating end portion 44 cooperates with the key underneath it to actuate that key.

The sleeve member 42 has a generally circular configuration and one end thereof 42A, is enlarged to engage the walls of the opening 46, in the key support member 12, to be fixed therein. As may be more readily seen in FIGURE 4, which is a cross sectional view along the lines 4—4, the sleeve has a plurality of apertures 42B, 42C, etc., at the upper end thereof. The cavity 46 has the cash register side thereof sealed by the enlarged end 42A, of the sleeve. The other end of the cavity is sealed by a circular plate 48, which is held against the other end of the cavity 46 by the sleeve 42. This plate 48, has a rectangular opening therein, whereby the pneumatically operated key 12A can move reciprocally despite the presence of the disk 48.

When a key, such as the key 12A, is to be operated, air is introduced from the air supply 30, and through the properly operated one of its control valves, thereafter through a tube such as the tube 50, shown in FIGURE 4, into the cavity 46. In view of the presence of the openings 42B, 42C, in the sleeve member, the air then proceeds through these openings into the chamber formed by the top of the piston portion 40, by the walls of the sleeve member 42, and by the disk or circular plate 48. Since the circular plate 48, cannot move in response to the pressure of the air, the pressure acts against the piston portion 40, causing it to move downward onto the key 13A. The key 13A is actuated causing the cash register to ring up the price associated therewith. As soon as the air supply is cut off then air can leak out of the chamber established at the top of the piston portion 40, through the space between the circular plate 48, and the shaft portion 34. As a result, the return spring operation on the register key itself restores the pneumatically operated key 12A to its initial position. The opening between the plate member 48 and the shaft portion 34 is deliberately made a trifle oversize to enable this operation to occur, but is not made so large as to enable the incoming air pressure to escape without depressing the piston portion 40.

The entire pneumatically operated key, including the threaded portion 36, the rectangular shaft portion 37, and the smaller cross sectional circular portions 38 and 44 and the piston portion 40 may all be milled from a single piece of rod.

FIGURE 4 as described above, shows the arrangement whereby air from the supply 30 and as directed from the control valves 28, may be carried over individual nozzles such as 50, 50A, 50B, to the air chambers 46 formed between the sleeves 42 and the openings 46 in the member 12. The member 12 may also have passages drilled therein such as the passage 52, which leads air to one of the chambers or openings 46.

FIGURE 5 is a view in section of the preferred embodiment of the label scanner of this invention taken along the lines 5—5 of FIGURE 2. The label scanner 14 includes a case 54 having a plurality of sections which thread into one another. The head section 54A has a translucent disk 56 mounted at one end thereof. The translucent disk has an opening therethrough, through which the stylus or probe 20 extends. The head section 54A of the case encloses the housings 58A, 58B, 58C, and 58D (there are four which are used in the embodiment of the invention, only three of these are shown) which support the four transducers or photocells and their associated illuminating sources.

The head section 54A of the housing 54, threads onto a first center section 54B, which encloses a series of distributor rings respectively 60A through 60F. The first center section 54B has bearings respectively 62, 64, mounted therein for the purpose of supporting for rotational movement the distributor rings 60A through 60F. One of these distributor rings is associated with each one of the photocells mounted in the housings respectively 58A through 58D. One of these rings is a common ground, and one of these rings together with ground is used for bringing power to the lights. These housings are also attached to a circular plate 66 by means of screws, for example 68. This circular plate is attached to an insulated shaft 70, on which the distributor rings 60A through 60F are also mounted. Openings are provided in the shaft 70, as may better be seen in FIGURE 6 of the drawings for the purpose of enabling the probe 20 to be reciprocally movable therein as well as for the purpose of permitting wiring for the lamps and photocells to be carried therein. The shaft 70 rotates in the bearings 62, 64. The disc 66 is attached to the shaft 70 to be rotatable therewith.

A second center portion 54C of the housing 54 is threaded on the first center portion 54B at one end and the other end has threaded thereinto a translucent portion 54D. The portion of the housing 54C has a circular wall 68 fixed in the lower portion thereof for the purpose of supporting a motor 74. The motor shaft 76 is fastened as by a set screw 78 to the shaft 70.

The translucent portion of the housing 54D encloses a light 80 which is illuminated when a successful reading from a label has occurred. Otherwise, the light 80 remains unilluminated. An end section 54E of the housing is threaded on the translucent portion 54D. This end section 54E includes a cap through which the wires for carrying power and from which the signal carrying wires extend.

From the foregoing description of the preferred embodiment of the label scanner of this invention it may be deduced that the motor 74 rotates a shaft 70 which carries rings for applying power and for removing signals, from the transducers or photocells and lamps which are supported on the shaft 70 to be rotated therewith. An enlarged detailed view in section of the structures enclosed by the sections 54A and 54B of the housing is shown in FIGURE 6. It will be seen there that contact with the distributor rings 60A through 60F for the purpose of applying power and for the purpose of removing signals is made employing brushes respectively 61A through 61F, which ride on the respective rings 60A through 60F. The center of the shaft 70 is hollow. Extending through this hollow center is a plastic cylinder 82, which is supported from the translucent disk 56, mounted in the face of the scanner. The probe 20 is reciprocally movable within this cylinder 82.

The probe comprises two portions respectively 20A and 20B. The portion 20A has a larger diameter than the portion 20B. The portion 20A supports a sleeve 84 which extends in the direction of the pointed end 20C of the probe 20. A compression spring 86 is carried within said sleeve and has one end abutting thereon. The other end of the compression spring, which is the end toward the pointed end 20C of the probe, abuts on a collar 88. Because of this compression spring, when pressure is removed from the outside tip of the probe, it is urged outwardly. The end of the compression spring 86 which abuts on the sleeve 84 is attached to the probe and keeps it from coming out of the housing. The position of the probe shown in FIGURE 6 is achieved when the probe is almost completely inserted into the housing. At that time the pointed end of the probe engages a switch 90, the details of which may be seen in FIGURES 9 and 10.

Figure 9:
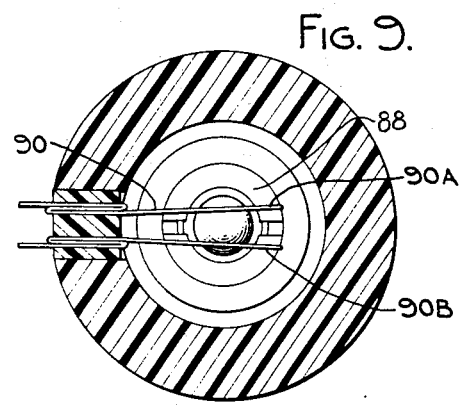
FIGURE 9 is a view along the lines 9—9 of FIGURE 6 illustrating the manner of operation of the starting switch by the probe.
Figure 10:
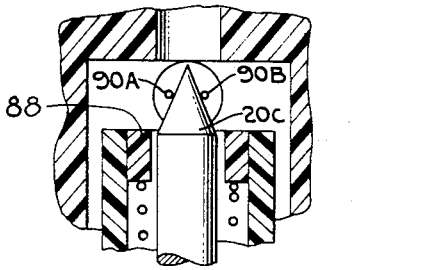
FIGURE 10 is a view along the lines 10—10 of FIGURE 6 illustrating further details of the probe and switch.

It may be seen from FIGURES 9 and 10 that the switch 90 is of the type wherein two oppositely extending leaf springs 90A, 90B, are biased inwardly toward one another when the tip 20C of the probe does not extend therebetween. When the probe is moved sufficiently into the housing so that the tip moves between the two leaf springs 90A, 90B, they are spread apart. In actual operation, with the probe withdrawn the switch 90 is inoperative. When the tip of the probe spreads the leaf springs 90A, 90B, far enough apart this switch is rendered operative. The switch 90 serves the function of initiating the operation of this invention, when it is operated.

Figure 8:
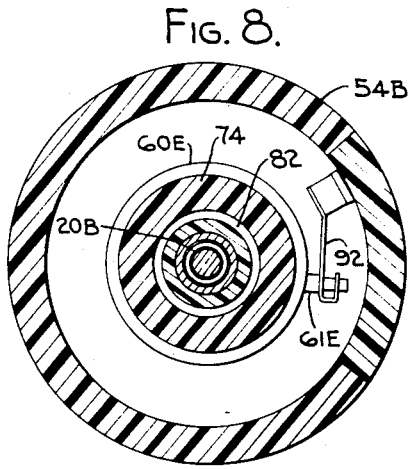
FIGURE 8 is a view in section along the lines 8—8 of FIGURE 6 illustrating the manner of picking off the signals provided by the photocells used in the scanner.

FIGURE 8 is a cross section view of the preferred embodiment of the label scanner of this invention taken along the lines 8—8 of FIGURE 6. It shows the housing section 54B within which the cylindrical rod 74 is rotatably mounted. Within this rotatable rod there is supported the fixedly mounted rod or cylinder 82. The probe 20 telescopes within the cylinder 82. A commutator ring 60E is mounted on the rod 74. The ring 60E rotates with the rod 74. Power to, or signals from, the ring 60E is taken by means of a brush 61E, which is held in a brush holder 92. The brush holder is attached to the side of the housing 54B to which electrical connection, not shown, may be made.

FIGURE 7 is a plan view of a preferred form of the label of this invention. The preferred label 18 has an alignment means or aligner which is preferably in the form of a central hole 18A into which the tip of the stylus 20 is engageable or inserted for the purpose of aligning the label scanner properly with respect to the label 18. The label scanner is then brought down over the label, whereby the probe telescopes into the body of the label scanner in the manner which has been described previously. The label may be considered as divided into four information bearing rings respectively designated as the timing ring 18B, the outer information ring 18C, the center information ring 18D and the inner information ring 18E. The timing ring contains the timing information and will always have four machine readable characters or indicia such as black marks respectively designated as $18B_1$ $18B_2$, $18B_3$, $18B_4$, which are always located in the predetermined positions shown, and which are separated from one another by the four white spaces. A fifth machine readable characters or indicia such as black mark $18C_1$, occupies a predetermined position in the next to the outer ring 18C, and is also used for timing purposes. The centers of the five timing marks are substantially equally displaced from one another. In addition to the five marks specified being used for timing purposes, they are also used for indexing purposes. These five marks effectively define five sectors within which machine readable information, preferably in the form of the presence or absence of black marks, are found. These five marks always appear on every label. In the outer ring of the sector defined by the black mark $18C_1$, there will always be a white mark, or the absence of a black mark. In the sector regions of the rings which are defined by the other black marks $18B_1$, $18B_2$, $18B_3$, $18B_4$, data is recorded in the form of machine readable characters which preferably take the form of the presence or absence of black marks.

There are four transducers preferably in the form of photocells, employed for scanning the concentric rings of the label 18. Each photocell is assigned to each ring. The dotted circular regions respectively 19A, 19B, 19C, and 19D define the relative areas which the photocells scan, and also indicate the relative photocell dispositions. The markings shown on the label 18, apart from the timing markings, may represent for example, the price $1.51, as written on the label and may also indicate other desired information concerning the goods such as the department concerned.

Figure 11:
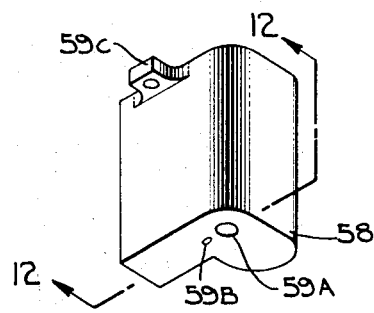
FIGURE 11 is an isometric view of a housing for a photocell and illuminating light used in the embodiment of the invention.

FIGURE 11 illustrates a typical housing 58, for a photocell and illuminating light source. The housing is somewhat L-shaped having two apertures at the base thereof in the region of the intersection of the two arms of the L. The larger of the two apertures 59A, emits illumination. The smaller of the two apertures 59B, provides the opening whereby the reflected light from the label can reach the scanning photocell. The housing 58, as shown in FIGURE 6 is attached to the circular plate 66, by means of a bolt 68, which passes through the bracket 59C which is attached to the housing 58.

Figure 12:
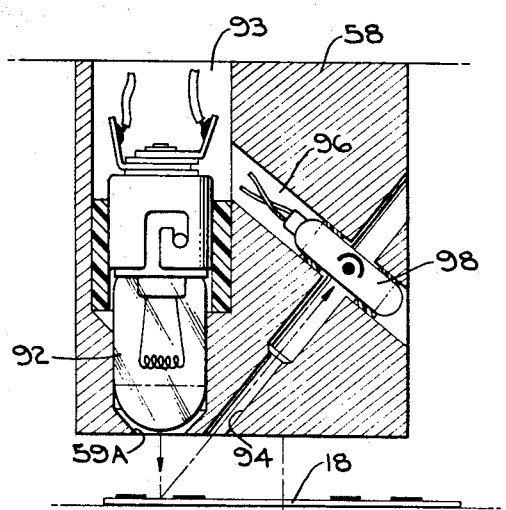
FIGURE 12 is a cross sectional view through the housing shown in FIGURE 11 taken along the lines 12—12.

FIGURE 12 is a cross section of the housing 58 as shown in FIGURE 11, taken along the lines 12—12. The housing is shown in operative position adjacent a label 18. It will be seen that the lamp 92 is positioned within a cavity in the housing 58 so that it may emit light through the opening 59A onto the label. The opening 59B terminates a passage 94, which is at an angle to the surface of the housing 58. This passage intersects another passage 96, within which a photocell 98 is positioned. The passage 96 opens onto the large opening 93, into which the lamp 92 is placed. The reason for the angular disposition of the passage 94 and the location of the photocell 98, is for the purpose of permitting only reflected light from the label 18 to reach the photocell 98. There is no direct transmission of light from the lamp 92 to the photocell 98 effected because of this arrangement.

Thus far, there has been described the mechanical portions of a preferred embodiment of the system of this invention which include the label scanner, the method of scanning or reading the label, the register and the mechanism for operating the keyboard employing pneumatically driven elements by control valves operated from solenoids. The description that follows is of the electrical portion of the system illustrating how the electrical signals sensed by the label scanner are processed in order to be able to properly control the solenoids.

Referring now to both FIGURES 13A and 13B, there may be seen circuit diagram of the electrical portion of the preferred embodiment of the invention. A power supply 100 is connected to the motor 74, and to the four label illuminating lights respectively 92A, 92B, 92C, and 92D. Associated with each one of these lights in the housing is a photocell respectively 98A, 98B, 98C, and 98D. The power supply 100 may be connected at all times to the motor 74 and to the four series connected lamps 92A through 92D, as shown. Alternatively, it may be preferred to have the motor 74 and the four lamps started up each time the switch 90 is closed. The arrangement shown is preferred however.

It was previously stated that the label had four rings and that a separate photocell was assigned for scanning each ring. The signal from each photocell is obtained from one of the commutating rings in the label scanner and then picked off by means of a brush. The signal from the photocell 98A, which is assigned to scan the timing ring of the label, (see 19A in FIG. 7) is connected to an amplifier 102A. The signals from a photocell 98B, which is assigned to scan the information ring next to the timing ring (see 19B in FIG. 7) designated as the outer information ring (O.I.R.) is connected to an amplifier 102B. The photocell 98C which is assigned to scan the next information ring (see 19C in FIG. 7) designated as the center information ring (C.I.R.) is connected to an amplifier 102C. The photocell 98D which is assigned to scan the inner information ring (I.I.R.), (see 19D in FIG. 7), is connected to an amplifier 102D. These amplifiers, which are driven in response to the output of the photocells are biased so that when the corresponding photocell is scanning a white area, a relay connected to the output of the amplifier can be actuated. When the photocell is scanning a black area, or is exposed only to stray room illumination, then the output of the associated amplifier cannot drive the relay. Hence, before the label sensor is placed in position to scan a label, none of the relays are actuated. After the sensor is in position to scan the label, the various relays may be actuated and/or deactuated in accordance with the black and white pattern on the label.

As shown by the circuit diagram in FIGURE 13, the information signal detected by the photocells are properly distributed by means of a stepping or selector switch 110, which has eight decks respectively, 110A through 110I. The stepping switch actuating coil 112, is operated in conjunction with the connections made on deck 110A. That is, one end of the stepping switch coil is connected to the selector arm on deck 110A and the other end is connected to ground. An arc suppressor varistor 114, is connected across the stepping switch coil for suppressing the occurrence of an arc. Each one of the decks of the stepping switch has 12 contact terminals comprising a first which is designated as the home position terminal and the remaining terminals which are numbered from 1 through 11.

The first deck of the stepping switch 110 has its selector arm wired to one end of the stepping switch actuating coil 112. Contacts 1 through 4 are connected together and contacts 6 through 11 are connected together. These serve the purpose of insuring that the stepping switch actuating coil receives the necessary current pulses from outer structures to be described, for sequencing the stepping switch properly.

The second deck of the stepping switch 110B, distributes information signals such as indicating the department information contained on the label. The third deck 110C, distributes information signals for actuating paper punch apparatus, if desired, from the information on the label.

Deck 110E, distributes signals from information derived on the label indicative of the price of the article to which the label is attached. Deck 5, 110F, sequences the readout of the information stored in the relays associated with the decks 2, 3, and 4, and also serves the function of providing an energizing signal to the light which indicates a successful reading has occurred in the label scanner.

Deck 6, 110G, serves the function of providing a circuit required for sending the stepping switch around to the home position in the event the stylus is lifted prematurely from the label. Deck 7, 110H, merely serves the function of energizing a cycle limiting relay 116, which prevents the label scanner from reading a label more than once.

Deck 8, 110I, serves the function of providing the required circuitry for checking whether or not the label scanner has been properly centered on the label, and in the event a successful reading of the label has been made, serves to hold the storage relays into which the information read is stored until they can be read out.

At this point it should be noted that the scanning of a label occurs during five steps of the stepping switch. The remaining steps of the stepping switch are used for other purposes including a readout of the information from the relays into which this information is stored to actuate the following mechanisms such as the cash register, in response to the information entered into those relays. Thus, the scan of a label is only the first portion of an operative cycle of this apparatus. The remaining portion of the operative cycle is occupied with the readout and control operation specified in the description of the apparatus shown in FIGURE 2.

Let us now consider the operations which occur when the stylus and label scanner are properly positioned over a label. It was previously described that a label will have five timing marks placed thereon, which are shown in FIGURE 7 as the timing marks $18B_1$ through $18B_4$, and $18C_1$. Timing mark $18C_1$ is the only one of the five which is not found in the timing ring. This mark is found in the outer information ring, and adjacent to it in the timing ring there is always a white area.

The stepping switch actuating coil 112, actuates the stepping switch mechanism to advance, not when it is energized by current, but only on the de-energization thereof, after an energization. With the stepping switch in the home position, it will be shown that the only way in which the stepping switch coil can receive an actuating current pulse is when a false start signal blocking relay 106 is energized, when an outer information ring photo relay 108 is not energized, and when the timing photocell relay 118, driven from the timing photocell signal amplifier 102A, is energized. This demands that the timing photocell 98A be scanning a white region at the time that the outer information ring photocell 98B be scanning a black region. This situation occurs on the label only when the photocells are scanning the areas designated in FIGURE 7 as 19A and 19B. 19B is over the timing mark $18C_1$ and 19A has just left the timing mark $18B_2$. The labels are made in a manner so that the rotating photocells will only see this combination once during a scan.

With the stylus properly positioned to energize the start switch 90, the relay 104 is energized. Thereby it applies power from the power supply 100, over a line designated as 120, and a connecting line 122 thereto, to cause operating potential to be applied to the false start relay 106, whereby it is energized. If at that time the timing photocell 98A and the outer information photocell 98B are respectively looking at the white and dark areas of the label, then timing relay 118 is energized and outer information relay 108 is not. When this situation arises power may be applied from the power supply 100 through the now closed contacts 104A to the stepping switch actuating coil 112, over a path which includes the following structures. From the contacts 104A over a line 120, and over the normally closed contacts 108A of relay 108 to the now closed contacts 106A of relay 106. From these contacts 106A over a bus 124 through the selector arm of deck 2, and thereafter over a bus 126 to the now closed contacts 118A of relay 118. Over a bus 128 from the contacts 118A and over another bus 130 connected thereto to the normally closed contacts 116A of a cycle limiting relay 116. From the normally closed 116A to the stepping switch actuating coil 112. Now as the photocells in the scanning head continue to rotate, the photocell 98A will see the timing mark $18B_3$ in response to which timing photo relay will be de-energized. This causes the opening of the now closed contacts 118A whereupon the stepping switch actuating coil can operate to cause the selector switch 110 to move from its home position to the position where the selector arms on the various decks make contact with the No. 1 contact terminal.

It has been shown that when the timing photo relay is de-energized no initiating current pulse can be applied to the stepping switch coil 112. This eliminates the possibility of an initiating operation of the label scanner when the timing photocell sees any one of the four black marks in the timing ring. Other than for the initial position, it can occur that the timing photocell and the outer ring photocell, respectively photocells 98A and 98B, will both see a white region at any one of the sectors between markings. Should this occur, then the normally closed contacts 108A are open, and therefore no current can be delivered to the stepping switch coil 112 to initiate operation of the stepping switches.

As soon as the stepping switches have been sequenced to the number one position, the selector arm on the seventh deck 110H, which is connected to the line 122, can apply an energizing potential over a line 132, which is connected to the cycle limiting relay 116. This relay is then operated, latching itself in the operated position over its now closed contacts 116B. These contacts supply power from the line 120 which is connected to the relay contacts 104A. This breaks the path which previously applied energizing potential to the stepping switch coil 112 through the normally closed contacts 116A.

It will be noted that the normally closed contacts 118B of the timing relay 118 connect to terminal 4 of the first stepping switch deck 110A. Terminals 1, 2, 3 and 4 are connected together. Thus a path for the application of power is provided over the starting relay contacts 104A, bus 120, contacts 118B when closed, and the contacts 1 through 4 on the stepping switch deck through the selector arm to the stepping switch actuating coil 112. However, it will be remembered that the actuating coil cannot effectuate the sequencing of the stepping switch except after an exciting current is removed. As the photo relay 98A scans the sequence of light and dark areas in the timing ring the timing photo relay 118 is alternately energized and de-energized to cause thereby sequencing of the stepping switch until it reaches the fifth contact position. At this position, the fifth contact is connected to the energization path which was initially required to move the stepping switch from its home position. Thus the fifth contact is now connected to normally open contacts 118A to line 126, to line 124, to normally open contacts 106A, to normally closed contacts 108A, and thence over line 120 and normally open contacts 104A to the power supply 100. In order to operate the stepping switch from the fifth to the sixth position it is therefore required that the timing photocell 98A and the outer information ring photocell 98B see respectively a white and a dark area. This is provided since at this time the label scanner returns to the initial scanning position on the label. As a result, the stepping switch can sequence from the fifth to the sixth position.

It will be seen that contacts 6 through 11 of the stepping switch first deck are connected together. These contacts are connected to potential source 100 through a path which includes switch contacts 112A, which are opened whenever the solenoid 112 is energized, and then through a normally closed contact pair 140B of a relay 140, which will hereafter be designated as the No. 2 eccentricity cut-off relay. It should be seen that as long as relay 140 remains inoperative the stepping switch will step sequentially through positions 6, 7, 8, 9, 10, 11, and back to home even though the stylus is removed from its contact with the label whereby the starting switch 90 would be open.

In the event that the label scanner were put in scanning position so that the starting switch 90 would close, and then for some reason it was removed prematurely, before the stepping switch could reach the sixth position, then the sixth deck 110G of the selector switch insures that the sixth stepping switch position could be reached and thereby the stepping switch could thereafter return to the home position. Contacts 1 through 5 of the sixth deck are connected together. The selector switch contacts 112A are not only connected to the sixth contact of the first deck 110A but are also connected over a line 142 to the selector arm of deck 110G. The fifth contact of this deck is connected over a line 144 to normally closed contacts 104D of the starting relay 104. These contacts will now be closed, since this mechanism does not become operative unless there is an early removal of the label scanner in contact with the label whereby starting relay 104 would become inoperative. The path for supplying sequencing current to the stepping switch coil 112 may now be completed from contacts 104D back to the stepping switch coil. The current path described commencing with the current from potential source 100 through normally closed contacts 140B of the relay 140, to the contacts 112A and thence to the stepping switch coil insures that the stepping switch is operated up until the selector arm of the first deck can make contact with the sixth contact terminal from whence it can sequence back to home.

It has been previously pointed out that the cycle limiting relay breaks the initiating path for enabling the selector switch to step from the home to the first position, as soon as the switch has attained the first selector switch position at which time the cycle limiting relay is rendered operative. When the stepping switch has reached the home position, the cycle limiting relay will be held operative as long as the stylus and the label scanner are maintained, so that starting switch 90 is closed. Therefore, a new scanning cycle cannot be initiated, since there is no other way for the stepping switch to get off from the home position until the cycle limiting relay is de-energized. Upon removal of the label scanner so that the stylus releases the starting switch 90, then the cycle limiting relay is also de-energized, but at this time no starting potential can be again applied to the stepping switch coil 112.

When the stepping switch is connected to the first contact position, a first eccentricity relay 142 is energized over a path which includes the first four contacts of the last or eighth deck and the sensing arm of this deck which is connected to the source of operating potential 100. The function of this relay together with eccentricity cutoff relay 140 is to prevent false readings from being entered into the storage relays, which can occur when the scanner is brought down upon a label so that the probe is not inserted into the center hole. This causes an eccentric relationship. This can cause false readings. Since the actual reading of the label occurs only during the interval required for the selector or stepping switch to step through the first five positions, this check must be made during only these five positions.

It will be seen that the coil of the eccentricity cutoff relay 140 may be energized in a path which extends through the contacts 146A, when closed, of relay 146. These contacts are connected over a line 148 to the normally open contact 116C of the cycle limiting relay 116. These contacts are closed in operation. The connection then extends through the line 130 to the contact 118A of timing relay 118. Now, should the situation occur that the timing relay 118 is energized and the outer information relay 108 is de-energized within the interval required for the selector switch to step from the first to the fifth selector position, then the eccentricity cutoff relay 140 will become energized over the path which has just been described. The energization-de-energization pattern just described for the timing relay and the outer information ring relay occurs only at one location of the label. That is the starting position. It can only happen more than once if the label scanner and label are eccentrically disposed relative to one another. At this time the photocells can cross rings in their scanning path rather than stay within the rings which they are supposed to scan.

The eccentricity cutoff relay 140, when operated, locks up over a current path including its contacts 140A which are connected to line 120. Operation of the eccentricity cutoff relay 140, opens a contact pair 140C which previously applied power over a path including contacts 104B of the starting relay, a line 150, through the contact pair 140C to a line 151. The line 151 must be energized over this path in order to hold the information in the relays which has been read while the label is being scanned. The power for doing this after a label has been scanned is received from the eighth deck of the stepping switch over the line 152 which during the interval from the sixth to the eleventh steps is connected to the source of operating potential over the selector arm of the eighth deck.

Accordingly, if an eccentricity is detected during the reading from a label the information received therefrom, is discarded. Also the stepping operation of the selector switch is interrupted, since contacts 140B are now open. Nothing further can occur unless and until the label scanner is removed from the label. At that time the relay 140 is de-energized whereupon the stepping switch will be sent to the sixth step position by the connections of the sixth deck 110G, in the manner previously described, and from the sixth to the home position by the connections through the now inoperative relay 140 contacts, 140B, and switch contacts 112A, in the manner previously described.

From the foregoing description it will be seen that circuit arrangement which has been described takes care of false starts, insuring that the label scanning always occurs from a predetermined position on the label, takes care of early removals of the label scanner from the label, and also takes care of eccentric location of the label scanner relative to the label. In the normal sequence, the information which is scanned by the photocell 98B in the outer information ring causes relay 108 to operate in accordance therewith, whereby signals are applied over the contacts 108A of the relay 108, over contacts 106A of the false start relay which is held in throughout the operation, over line 124 to the selector arm of deck 2, 110B. Thus, if relay 108 is de-energized when it is connected to any one of the first four contacts on this deck, then the one of the four relays 153A through 153D, which is connected to the respective terminals are energized. These relays, by way of illustration are designated as representing the department information. The energized ones of the relays receive potential to be maintained energized over line 151.

Each one of the department storage relays 153A through 153D has a pair of contacts exemplified by contact pair $153A_1$ which is connected to an associated solenoid exemplified by solenoid 156. These solenoids 156 are not energized however, until the selector switch has reached the eleventh position. At this time all of the solenoids which are connected to energized ones of the storage relays, may be operated over a line extending from these contacts $153A_1$ to the eleventh terminal of deck 110F. At this time these solenoids are energized whereby they may energize the associated ones of the control valve represented by the rectangle 28 in FIGURE 2.

The center information ring is scanned from a photocell 98C. Whenever a white region is seen then the relay 160 is energized. Relay 160 has a normally closed contact pair 160A which when the relay is de-energized apply potential from the line 120 the selector arm of deck 110C. Operation of the center information relay in response to the data converted into electric signals by the photocell 98C for energizing one of the relays 162A through 162E, designated as punch storage relay, should be apparent. A black region in the center information ring will energize the one of the punch relays connected to a terminal one the deck to which the selector arm is connected at that time.

A different punch solenoid 164 is associated with each one of the punch relays 162A through 162E. Each one of these punch solenoids is connected through a closed one of a normally open contact pair, exemplified by contact pair $162A_1$ to the tenth terminal on deck 110F of the selector switch. Thus, those of the storage relays which have been energized, will close circuits for the energizations of their associated punch solenoids when the selector switch reaches the tenth selecting position. The punch solenoid 164 may operate associated ones of the control valves or paper punch apparatus, as desired.

The photocell 98D scans the inner information ring and will energize a relay 166 whenever a white region is scanned. Relay 166 has a normally closed contact pair 166A, which, whenever the relay is de-energized, can apply power to the selector arm of deck 110E from line 122. There are five relays designated as price-storage relays respectively 168A, through 168E, connected to the respective terminals 1 through 5 of the fourth deck of the selector switch, Each one of these relays may be energized if the selector switch is at their contact position and the inner information relay 166 is de-energized at that time. These relays are locked in, once they are energized, by being connected to line 151. Each one of these relays has a price key solenoid, exemplified by solenoid 170 connected to a normally open contact pair, exemplified by contact pair $168A_1$. The respective contact pairs when closed, connect the price solenoids to the ninth terminal or contact position on deck 110F. When the selector arm on this deck reaches the ninth position then the price solenoids are energized, whereby they energize the associated ones of the control valves for applying air to operate the register keyboard.

Deck 110F besides providing the requisite energization, potential to the various solenoids, when it attains the seventh contact position also provides an indication whereby the user of the label scanner will know whether or not a successful reading of the label has been accomplished. It will be recalled that a light 92 is mounted in the label scanner. This light has one terminal connected to contact 7 on deck 110F of the selector switch and the other terminal connected to ground. As a result, when the selector arm 110F reaches the seventh position a light 92 is illuminated. In addition, it is maintained illuminated, after the selector arm has passed this position by being connected to a relay 172 desgnated as the finish signal holding relay. This relay has a contact pair 172A over which it is held closed until the label scanner has been withdrawn from contact with the label. This is effectuated by connecting the contacts 172A from one side of the relay coil 170 over a line 174 to contact pair 140C of the starting relay 104.

The apparatus which has been described serves the function of reading a label and converting the information read into signals which can thereafter be used for operating a keyboard or other utilization apparatus as desired. The label scanner provides safeguards against false reading due to eccentricity or erroneous starts, as well as due to the label scanner not being in proper position with relation to the label, whereby the scanning operation does not commence at all. Further, the apparatus provides a light which indicates that a successful label reading operation has occurred. Should a successful label reading not have occurred for any of the previous reasons, then the user is advised thereby by the absence of the finish signal light illumination.

I claim:

1. A system for scanning a label, having predetermined markings thereon representing data comprising a scanner including probe means extending from said scanner for aligning said scanner properly with said label for scanning same, means in said scanner for translating data on said label into electrical signals, storage circuits, means indicating a proper alignment of said scanner with said label for entering said electrical signals into said storage circuits to be stored therein, and means for utilizing the data stored in said storage circuits after said label has been scanned.

2. Apparatus for deriving information from a label on which said information is recorded as predetermined markings, and entering said information into a keyboard comprising a scanner for said label, a probe extending from an end of said canner, means for supporting said probe within said scanner to enable it to be moved into said scanner when said scanner and probe are moved against another object, means for spring biasing said probe to extend externally from said scanner, means within said scanner for converting the information on said label into electrical signals, circuit means for responding to said electrical signals, switch means actuated upon said probe being inserted a predetermined distance into said scanning means for enabling said circuit means to receive said electrical signals, said circuit means including means for storing the data contained in said electrical signals, said circuit means including means operative after the storage of said electrical signals for entering into said keyboard the data stored in said storage means.

3. Apparatus as recited in claim 2 wherein said label has said predetermined data recorded in concentric rings thereon and there is a hole in the center of said label into which the end of said probe is inserted for the purpose of aligning said scanning means with the data on said label.

4. The combination of a label having data thereon disposed in concentric rings and having a hole therethrough at the center of said concentric rings, and a scanner for deriving information from said label said scanner comprising a housing containing a photocell for each concentric ring of information on said label, means for rotatably supporting said photocell for scanning its associated concentric ring on said label, a probe, means for supporting said probe for reciprocal motion into and out of said housing, means for spring biasing said probe to extend externally of said housing, said probe having an end for insertion into the hole in the center of said label, switch means, means for supporting said switch means within said housing to be actuated by said probe when it is inserted into said housing a predetermined amount, circuit means rendered operative responsive to said switch means being rendered operative, means for applying the signals generated by said photocells responsive to the data on said label to said circuit means, said circuit means including a plurality of relays, means for distributing said electrical signals to selected ones of said plurality of relays in accordance with the information represented by said signals to be stored therein, said circuit means including means responsive to a predetermined signal pattern in said signals for initiating said signal distribution, means contained within said housing for providing an indication that the reading of data on said label has been completed, and means for deriving the information stored in said relays.

5. In a system for scanning data disposed as predetermined markings in concentric rings on a label, a scanner comprising a housing having therein a photocell for each one of said concentric rings a light source for each one of said concentric rings, means for supporting rotatably each one of said photocells and light sources at one end of said housing for illuminating and deriving signals from the data in each of the concentric rings associated therewith, means within said housing for rotating said photocells and light sources, probe means for aligning said housing with a label and for insuring that a scanner is at a proper reading distance from a label, said probe means including a probe having a tip adapted to engage the center of a label, means for supporting said probe means to be insertable into said housing at the center thereof, spring means for yieldably biasing said probe means to extend from said one end of said housing, switch means, means for supporting said switch means to be rendered operatively by an end of said probe means which is within said housing when said probe means is inserted a predetermined amount within said housing, and a motor within said housing for rotating said photocells and lights.

6. The structure recited in claim 5 wherein there is a housing for each said photocell and light means, said housing having a first opening therethrough said light means residing in said first opening, a second opening through said housing disposed at an angle to said first opening, said photocell residing in said second opening, the angle that said second opening makes with said first opening being determined as the angle which will permit said photocell to receive light only from its associated concentric ring of data which is illuminated by the associated light means.

7. The structure recited in claim 5 wherein said housing has a translucent portion, there is included in said housing a light means for indicating when said scanner has completed a successful reading of a label, and means for holding said light means at the translucent portion of said housing.

8. In apparatus for scanning a label for translating the data thereon into electrical signals and for thereafter operating a keyboard in response to said electrical signals, mechanism for operating the keys of said keyboard comprising a separate pneumatically operated key for each one of the keys of said keyboard, means for supporting said pneumatically operated keys over the keys of said keyboard, a separate control valve for each of said pneumatically operated keys, means for applying air to said control valves, and means for operating said control valves responsive to said electrical signals for selectively admitting air to said pneumatically operated keys for causing said keys to depress the keys of said keyboard over which they are positioned.

9. A system for scanning a label having data thereon in the form of predetermined markings comprising a scanner, photocell means within said scanner for scanning the data on said label, and for producing electricals signals representative thereof, relay means for storing data signals derived from said label, circuit means to which signals from said scanner are applied for entry into said relay storage means, said circuit means including means for detecting when a scanner is properly aligned with a label to enter the signals derived therefrom into said relay storage means, means for detecting when said scanner is improperly aligned with said label for preventing entry of said signals derived from said label into said relay storage means, said circuit means including means responsive to said signals derived by said scanner for permitting only a single cycle of scanning to occur, said circuit means including means for indicating when a proper scanning cycle has occurred, and means for operating a keyboard in accordance with the data stored by said relay circuit means.

10. Apparatus as recited in claim 9 wherein said means for operating a keyboard in response to the data stored in said relay circuits comprises a pneumatically operated key for each one of the keys in said keyboard, means for supporting said pneumatically operated keys for actuating an associated keyboard key when said pneumatically operated key is actuated, means for actuating each one of said pneumatically operated keys including a separate control valve for applying air thereto, and means for operating said control valves in response to operated ones of said relay circuits.

11. The combination of a label having data disposed in concentric rings thereon in the form of predetermined marking and having a hole in the center, a scanner having at least one photocell for each concentric ring of data therein, means in said scanner for insertion into the hole in said label for properly aligning the photocells in said scanner opposite the concentric rings of data on said label with which said photocells are associated, means within said scanner for rotating said photocells to generate electrical signals representative of the data in the concentric ring of data scanned by each one of said photocells, circuit means to which said electrical signals are applied, said circuit means including selector switch means, means for sequencing said selector switch means responsive to electrical signals from at least one of said photocells, a plurality of relays connected to said selector switch means, means for applying the signals from the remaining ones of said photocells means to said selector switch means to energize said relay means to store the data represented by said electrical signals, a keyboard and means for energizing said keyboard in accordance with the data stored by said relays.

12. A method of recording sensible information on a label in an easily read pattern comprising the steps of:
providing an aligner on said label, and
imprinting said sensible information on said label in circumferentially spaced data regions arranged in at least one circular pattern centered about said aligner.

13. A method of recording sensible data on a label in an easily read pattern comprising the steps of:
providing an aligner on said label, and
imprinting said sensible data on said label in circumferentially spaced data regions arranged in a first circular pattern centered about said aligner and in concentricity with a second circular pattern of sensible timing information also arranged in circumferentially spaced data regions.

14. A method of reading a label bearing sensible information arranged in circumferentially spaced data regions arranged in a circular pattern centered about an aligner, said method comprising the steps of:

relatively moving a probe and said label aligner into engagement to thereby center said sensible information about said probe, and relatively moving said label and a transducer in a circular path centered about said probe to thereby sequentially sense said information in said circumferentially spaced data regions.

15. A method of transferring information comprising the steps of:

imprinting sensible information on a label in circumferentially spaced data regions arranged in a first circular pattern centered about an aligner and in concentricity with a second circular pattern of sensible timing data also arranged in circumferentially spaced data regions, relatively moving a probe and said label aligner into engagement to thereby center said information and said timing data about the axis of said probe, relatively moving said probe and a transducer radially offset from said probe axis in a path parallel to said probe axis until said transducer is in sensing relationship to said data and said information, and relatively moving said label and said transducer in a circular path centered about said probe to thereby sequentially sense said data and information in said circumferentially spaced data regions.

16. A method of reading a label bearing sensible information in circumferentially spaced data regions arranged in a circular pattern centered upon an aligner, said method comprising the steps of:

relatively moving a probe and said aligner into engagement to thereby center said sensible information about said probe, relatively moving said label and a transducer radially offset from said probe axis in a path parallel to said probe axis until said transducer is in sensing relationship to said information, and relatively moving said label and said transducer in a circular path centered about said probe to thereby sequentially sense said information in said circumferentially spaced data regions.

17. Apparatus for reading a label having data recorded in a circular pattern centered about an aligner formed in said label, said apparatus comprising:

a data scanner movable in a circular scanning path for scanning data recorded in said circular pattern and producing electrical data signals representative of said scanned data, a probe located at the center of said scanning path for aligning said scanning path and said circular pattern when said probe and aligner are engaged, and a checking circuit responsive to said electrical data signals for providing an output upon the completion of a successful label reading operation.

18. The apparatus of claim 17 further including an indicator responsive to said output for providing a humanly perceptible indication upon the completion of a successful label reading operation.

19. The apparatus of claim 17 further including a storage circuit capable of storing said electrical data signals, said storage circuit being responsive to said checking circuit output for transferring the stored data to a utilization device upon the completion of a successful label reading operation.

20. The apparatus of claim 19 further including an indicator responsive to said checking circuit output for providing a humanly perceptible indication upon the completion of a successful label reading operation.

21. The apparatus of claim 20 wherein said indicator is a lamp for providing a visible indication upon the completion of a successful label reading operation.

22. Apparatus for reading a label having data recorded in a circular pattern centered about an aligner formed in said label, said apparatus comprising:

a data scanner movable in a circular scanning path for scanning data recorded on a label positioned at a read station and producing electrical data signals representative of said scanned data, a probe located at the center of said scanning path for aligning said scanning path and said circular pattern when said probe and aligner are engaged, a storage circuit capable of storing said electrical data signals, and a label removal detection circuit for providing an output when a label is removed from said read station prior to completion of a successful label reading operation.

23. The apparatus of claim 22 wherein said storage device is responsive to said output for emptying the contents of said storage circuit thereby readying said storage circuit for a subsequent reading operation.

24. Apparatus for reading a label having data recorded thereon in a circular pattern centered about an aligner formed in said label, said apparatus comprising:

a data scanner movable in a circular scanning path for scanning data recorded on a label positioned at a read station and producing electrical data signals representative of said scanned data, a probe located at the center of said scanning path for aligning said scanning path and said circular pattern when said probe and aligner are engaged, a storage circuit capable of storing said electrical data signals, and a false start circuit responsive to a label eccentrically positioned at said read station for preventing storage of said electrical data signals by said storage circuit.

25. A label adapted to be read by a scanner having a sensor mounted for movement in a circular scan path centered about a central member, said label comprising:

a sheet of material having sensible data recorded on the surface thereof in circumferentially spaced data regions arranged in at least one circular pattern, and a label scanning aligner located at the center of said pattern for aligning said circular pattern of data regions with said scan path when said central member is coupled with said aligner and said label and sensor are in sensing relationship to each other.

26. The label of claim 25 wherein said aligner comprises a substantially continuous wall defining a hole.

27. The label of claim 26 wherein said hole passes entirely through said label.

28. An article of manufacture comprising:

an information bearing surface having sensible data recorded on the surface thereof in circumferentially spaced data regions arranged in at least one circular pattern, said data adapted to be read by a scanner having a sensor mounted for movement in a circular scan path centered about a central member, and a label scanning aligner located at the center of said pattern for aligning said circular pattern of data regions with said scan path when said central member is coupled with said aligner and said label and sensor are in sensing relationship to each other.

29. A label adapted to be read by a scanner having at least two sensors mounted for movement in different concentric circular scan paths centered about a central member, said label comprising:

a sheet of material having sensible information and sensible timing data recorded on the surface thereof in circumferentially spaced information and timing data regions of at least two different concentric circular patterns, and a label scanning aligner located at the center of said pattern for aligning said circular pattern of data regions with said scan path when said central member is coupled with said aligner and said label and sensor are in sensing relationship to each other.

30. The combination comprising:

a sheet of material having data recorded on the surface thereof in a circular pattern of circumferentially spaced data regions;

a label scanner alignment means centrally disposed on said label with respect to said circularly arranged data; and a scanner for said label including means for cooperating with said label scanner alignment means for aligning said scanner for properly reading said data recorded on said label, sensing means in said scanner movable in a circular scan path centered about said cooperating means for scanning data on said label and producing electrical signals representative thereof, and means in said scanner responsive to a proper alignment of said scan path and said circular pattern for utilizing said electrical signals.

31. The combination as recited in claim 30 wherein said label scanner alignment means comprises walls forming a hole in said label, and said probe means includes a rod dimensioned to fit within said hole.

32. The combination as recited in claim 31 wherein said rod extends from one end of said scanner, means within said scanner for supporting said rod to enable it to be moved within said scanner when said rod is pressed against another object, means for spring biasing said rod to extend outwardly from said scanner, and switch means actuated upon said rod being inserted a predetermined distance into said scanner to enable said electrical signals produced by said means for scanning data on said label to be transferred out of said scanner.

33. The combination as recited in claim 30 further including storage means for storing the electrical signals representative of the data on said labels as they are being read, and wherein said means responsive to a proper alignment includes means responsive to a predetermined sequence of said electrical signals to detect the completion of a successful reading of the data on said label, and means responsive to said detection of a successful reading of data to enable transfer of said electrical signals out of said storage means.

34. A scanner for sequentially sensing data recorded on the surface of a label in circumferentially spaced data regions arranged in at least one circular pattern centered about a label scanning aligner, said scanner comprising the combination of:

a sensor mounted for movement in a circular scan path for sensing data on a label properly positioned at a read station, and a member located centrally of said circular scan path and adapted to cooperate with the label scanning aligner of a label for aligning said circular pattern of data regions with said scanning path when said label is positioned at said read station.

References Cited
UNITED STATES PATENTS

| | | |
|---|---|---|
| 2,612,994 | 10/1952 | Woodland et al. |
| 3,074,634 | 1/1963 | Gamo. |
| 3,097,347 | 7/1963 | Simjian. |
| 3,229,075 | 1/1966 | Palti. |
| 1,753,991 | 4/1930 | Langford _____ 235—61.6 |
| 2,980,319 | 4/1961 | Clemens et al. _____ 235—61.11 |
| 3,003,694 | 10/1961 | Oxley et al. _____ 325—146 |

DARYL W. COOK, *Primary Examiner.*